(12) United States Patent
Edelmayer

(10) Patent No.: US 9,382,821 B2
(45) Date of Patent: Jul. 5, 2016

(54) BIASED NORMALLY OPEN CHECK VALVE ASSEMBLY

(71) Applicant: Thomas C Edelmayer, Farmington Hills, MI (US)

(72) Inventor: Thomas C Edelmayer, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 279 days.

(21) Appl. No.: 14/069,550

(22) Filed: Nov. 1, 2013

(65) Prior Publication Data

US 2015/0122340 A1    May 7, 2015

(51) Int. Cl.
*F01L 9/02* (2006.01)
*F02N 19/00* (2010.01)
*F16K 15/04* (2006.01)
*F16K 25/02* (2006.01)
*F16K 24/04* (2006.01)

(52) U.S. Cl.
CPC . *F01L 9/02* (2013.01); *F02N 19/00* (2013.01); *F16K 15/04* (2013.01); *F16K 24/046* (2013.01); *F16K 25/02* (2013.01); *Y10T 137/0379* (2015.04); *Y10T 137/2931* (2015.04); *Y10T 137/7848* (2015.04)

(58) Field of Classification Search
CPC ............ F01L 9/02; F02N 19/00; F16K 15/04; F16K 24/046; F16K 25/02

USPC .......... 137/512.3, 513.3, 513.5, 513.7, 519.5, 137/533, 533.11, 533.21
See application file for complete search history.

(56) References Cited

U.S. PATENT DOCUMENTS

| | | | | |
|---|---|---|---|---|
| 1,577,740 | A * | 3/1926 | Macomber | E21B 21/10 137/513.7 |
| 5,758,613 | A * | 6/1998 | Edelmayer | F01L 1/24 123/90.35 |
| 5,855,191 | A | 1/1999 | Blowers et al. | |
| 7,082,967 | B2 * | 8/2006 | Sarajian | F16K 15/148 137/512.15 |
| 2009/0032752 | A1 * | 2/2009 | Nagasaki | F16K 31/06 251/129.15 |

FOREIGN PATENT DOCUMENTS

FR    2153737 A5 *    5/1973    ............ F16K 24/046

* cited by examiner

*Primary Examiner* — Mary McManmon
*Assistant Examiner* — Richard K Durden

(57) ABSTRACT

A biased normally open check valve assembly for facilitating Multiair® engine start-up after extended periods of non-use. The check valve is biased in an open position and allows for the ventilation of air out of the system so that the engine can start. The check valve also comprises a metering groove in a valve seat. The metering groove is configured to allow a controlled flow of hydraulic fluid through the check valve when the check valve is in a closed position.

10 Claims, 6 Drawing Sheets

BIASED NORMALLY OPEN CHECK VALVE ASSEMBLY

FIELD

The present disclosure relates to a check valve assembly for an internal combustion engine containing a MultiAir® system and/or related electro-hydraulic valve actuation technology.

BACKGROUND

Recent developments in internal combustion engine technology have led to newly developed MultiAir® engine technology. Engines with MultiAir® technology are different from traditional internal combustion engines in that they comprise a valvetrain with electro-hydraulic valve actuation, instead of a traditional camshaft, to provide full control over the intake air valves' lift and timing. This has provided improvements in vehicle fuel consumption, emissions, and power.

Currently, however, MultiAir® engines may take additional time to start-up after extended periods of non-use, e.g., storage. Because of the construction of the MultiAir® actuator assembly, a number of clearances exist where hydraulic fluid (i.e., engine oil) can very slowly leak out of internal pressure and reservoir chambers. The space previously occupied by the hydraulic fluid subsequently becomes occupied by air. During engine start-up and operation, the hydraulically actuated valves require hydraulic fluid to function. If air has replaced some of the hydraulic fluid in the chambers, the air must be purged and hydraulic fluid must reenter the chambers before valve actuation and engine start-up can occur.

The current MultiAir® system uses two tiny orifices to purge air from the hydraulic fluid pressure chambers during MultiAir® engine start-up and to circulate hydraulic fluid during MultiAir® engine operation. The orifices are located in a plate which closes the top of the hydraulic fluid mid-pressure chambers. These orifices, however, contribute to the leaking of hydraulic fluid when the engine is not used. The orifices of the current MultiAir® system also limit ventilation of unwanted air from the chambers at engine start-up. As a result, when hydraulic fluid leaks out of the MultiAir® system and is replaced by air during extended periods of MultiAir® engine non-use, engine start-up can be delayed, requiring additional time (i.e., longer than normal) for engine start-up. In severe instances of hydraulic fluid leakage, the MultiAir® engine may not start.

The orifices of the current MultiAir® system also do not prevent the siphoning of air back into the hydraulic fluid pressure chambers upon engine shut-down. This further adds to the delayed start-up of the engine because more air must be purged from the system.

Accordingly, there is a need and desire to provide an apparatus that improves and facilitates the start-up of a MultiAir® engine after long periods of standstill and non-use.

SUMMARY

In one form, the present disclosure provides a check valve assembly for facilitating engine start-up. The check valve assembly comprises a body with a valve inlet, valve outlet, valve seat, and valve opening. The check valve assembly further comprises a metering groove in the valve seat. The metering groove is configured to allow a controlled flow of hydraulic fluid through the check valve assembly when the check valve assembly is in a closed position. The check valve assembly is biased in a normally open position, allowing air to flow through the check valve assembly and out the valve outlet, until hydraulic fluid enters the valve inlet causing the check valve assembly to move to the closed position.

The present disclosure also provides a method for facilitating engine start-up. The method comprises purging air from a hydraulic fluid pressure chamber using a check valve assembly, controlling the flow of hydraulic fluid through the check valve assembly using a metering groove, and preventing air and hydraulic fluid from entering the check valve assembly at a valve outlet using an anti-siphoning umbrella valve.

The present disclosure also provides a check valve assembly that comprises an anti-siphoning umbrella valve at the valve outlet to prevent air and hydraulic fluid from entering the check valve assembly through the valve outlet. The anti-siphoning umbrella valve further prevents air and hydraulic fluid from exiting the check valve assembly at the valve outlet when the engine is off.

The present disclosure also provides a check valve assembly that comprises a check ball which is operable to engage the valve seat. The check ball is connected to one end of a biasing spring and the other end of the spring is connected to a spring seat disposed against the valve seat In one embodiment, the check valve assembly is in the open position when the check ball is positioned away from the valve seat and the check valve assembly is in the closed position when the check ball engages the valve seat. The valve seat may be tapered or curved.

In another embodiment, hydraulic fluid enters and exits the metering groove at opposite sides of the surface where the check ball engages the valve seat. The area and shape of the metering groove define the volumetric flow rate of the hydraulic fluid through the metering groove at a given hydraulic fluid pressure, temperature, and viscosity. The metering groove may be semi-circular shaped. In one embodiment, the check valve may comprise multiple metering grooves.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its applicability or use. Thus, variations that do not depart from the substance of the invention are intended to be within the scope of the invention.

DETAILED DESCRIPTION

The check valve assembly disclosed herein facilitates MultiAir® engine start-up after extended periods of non-use, (e.g., storage). More particularly, the disclosed check valve assembly facilitates the ventilation of air out of a MultiAir® system so that the engine can start without problems that occur in prior art systems. Air may be present within the MultiAir® system due to leakages within the system, dissolved air coming out of solution with the hydraulic fluid (i.e., oil), or maintenance and/or repair of the MultiAir® system. As the hydraulic fluid pump delivers hydraulic fluid to the MultiAir's® hydraulic fluid pressure chambers, the unwanted air is pushed up through the check valve assembly and the air is successfully purged.

The check valve assembly disclosed herein also includes a metering groove that is configured to allow a controlled and limited flow of hydraulic fluid through the check valve assembly once the unwanted air has been purged and the engine has started. This ensures that the hydraulic fluid is adequately circulated and cooled for engine operation.

The check valve assembly disclosed herein may also include an anti-siphoning umbrella valve that prevents air and hydraulic fluid from siphoning back into the hydraulic fluid pressure chambers once the hydraulic fluid pump is turned off and engine operation ceases. Additional anti-siphoning umbrella valves may also be installed downstream of the check valve assembly.

Figure 1:
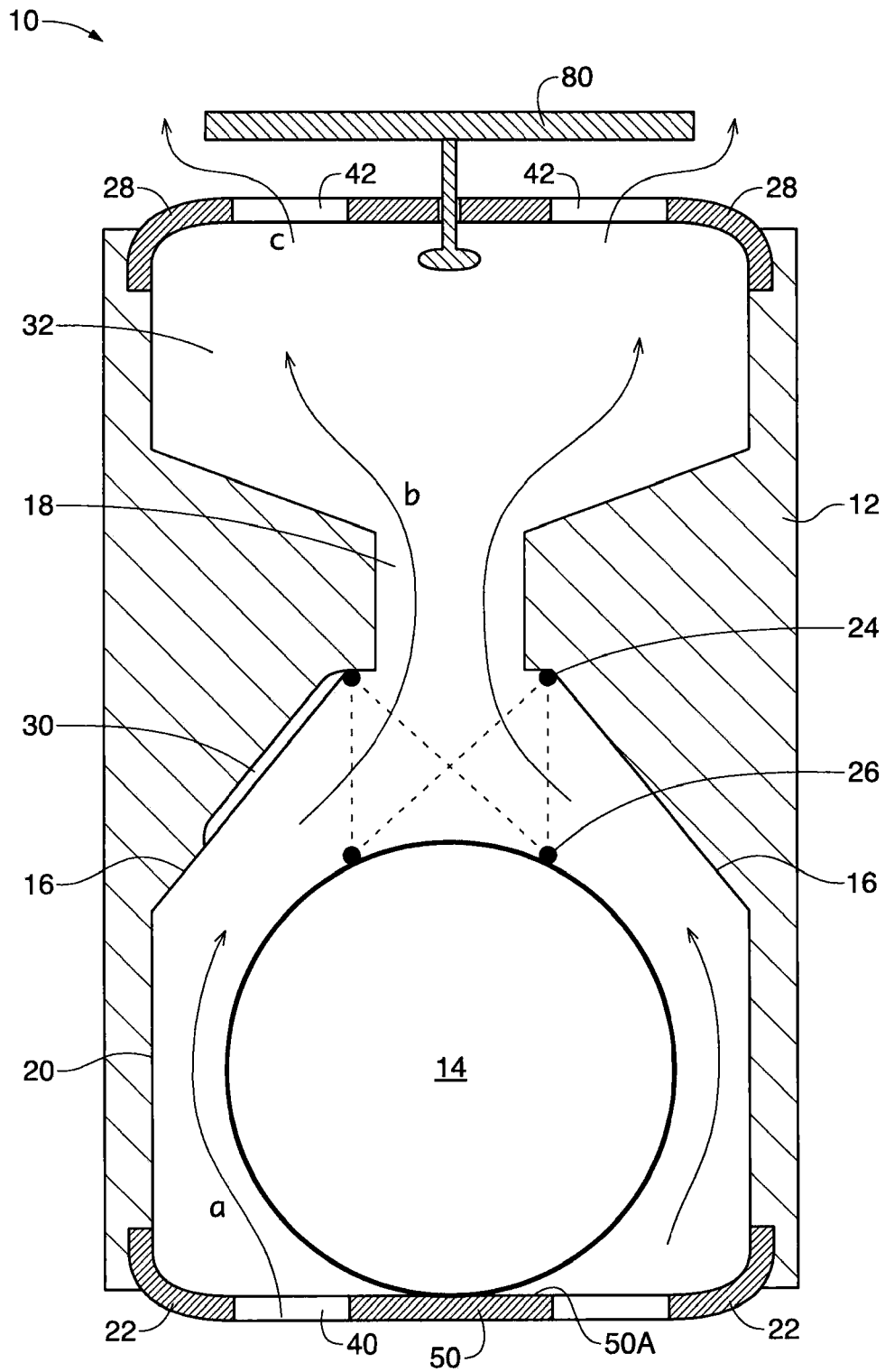
FIG. 1 is an axial cross-section of a biased normally opened check valve assembly, constructed in accordance with the present disclosure.

FIG. 1 represents a biased normally opened check valve assembly 10, constructed in accordance with the present disclosure. The check valve assembly 10 comprises a body 12 that includes a check ball 14, which is operable to engage a valve seat 16. The valve seat 16 is defined by a surface formed between a valve opening 18 and a bore 20. A metering groove 30 is formed in the valve seat 16. The check valve assembly 10 may comprise any material, such as e.g., steel, that is impact resistant and durable.

In its normal function, the check ball 14 is positioned away from the valve seat 16, permitting the unrestricted flow of air from a valve inlet 40 (flow arrow a), through valve opening 18 into a chamber 32 (flow arrow b), and to a valve outlet 42 (flow arrow c). The valve outlet 42 is defined by the openings in the upper retainer 28. The valve inlet 40 is defined by a lower retainer 22, which facilitates flow through the check valve assembly 10. The lower retainer 22 also includes a central portion 50, including a surface 50a, to limit the movement of the check ball 14, away from the valve seat 16, to the fully open position. The central portion 50 may alternatively include any other suitable configurations to limit the movement of the check ball 14, including, but not limited to, an opening in the central portion 50 that limits the movement of the check ball 14. The flow of air through check valve assembly 10 causes an anti-siphoning umbrella valve 80 at the valve outlet 42 to open so that air can exit the valve outlet 42. The anti-siphoning umbrella valve 80 is affixed to the upper retainer 28, which defines the valve outlet 42. The anti-siphoning umbrella valve 80, which is operable by gravity or differential pressure to open and close the valve outlet 42, allows air and hydraulic fluid to exit the check valve assembly 10 through the valve outlet 42 (when open) and also prevents air and hydraulic fluid from entering the check valve assembly 10 through the outlet valve 42 (when closed).

The check valve assembly 10 also comprises a spring seat 24 disposed at the upper end of the valve seat 16 or within the valve opening 18 (not shown). The spring seat 24 is preferably concentric with the valve opening 18. Disposed against the spring seat 24 is one end of a compression spring 26. The other end of spring 26 is in engagement with the check ball 14. The spring 26 is selected in terms of its spring rate, number of turns, etc., such that the check ball 14 is maintained at a predetermined, repeatable distance from the valve seat 16, in the absence of hydrodynamic forces acting on the check ball 14. Thus, when air flows through the check valve assembly 10, the spring 26 and check ball 14 maintain the check valve assembly 10 in the open position. This occurs because the viscous drag force produced by the flow of air around the check ball 14 is not sufficient to overcome the combined opposing forces of the spring 26 and the weight of the check ball 14.

Various spring configurations can be utilized, an example being a helical compression spring. Another example is a spring disposed within the chamber 32 which utilizes a push-rod extending through the valve opening 18 to transmit the force of said spring against the check ball 14, disposing the check valve assembly 10 in a normally open position. Further, the check valve assembly 10 may comprise a member other than the check ball 14 to engage the valve seat 16, such as a cylindrical or hemispherical member (e.g., a disk), or some other suitable member. Thus, the illustrated check valve assembly 10 is not limited to use with a check ball 14.

In another embodiment, the check valve assembly does not include an anti-siphoning umbrella valve 80. Instead, anti-siphoning umbrella valves 80 may be installed downstream of the check valve assembly 10.

Figure 2:
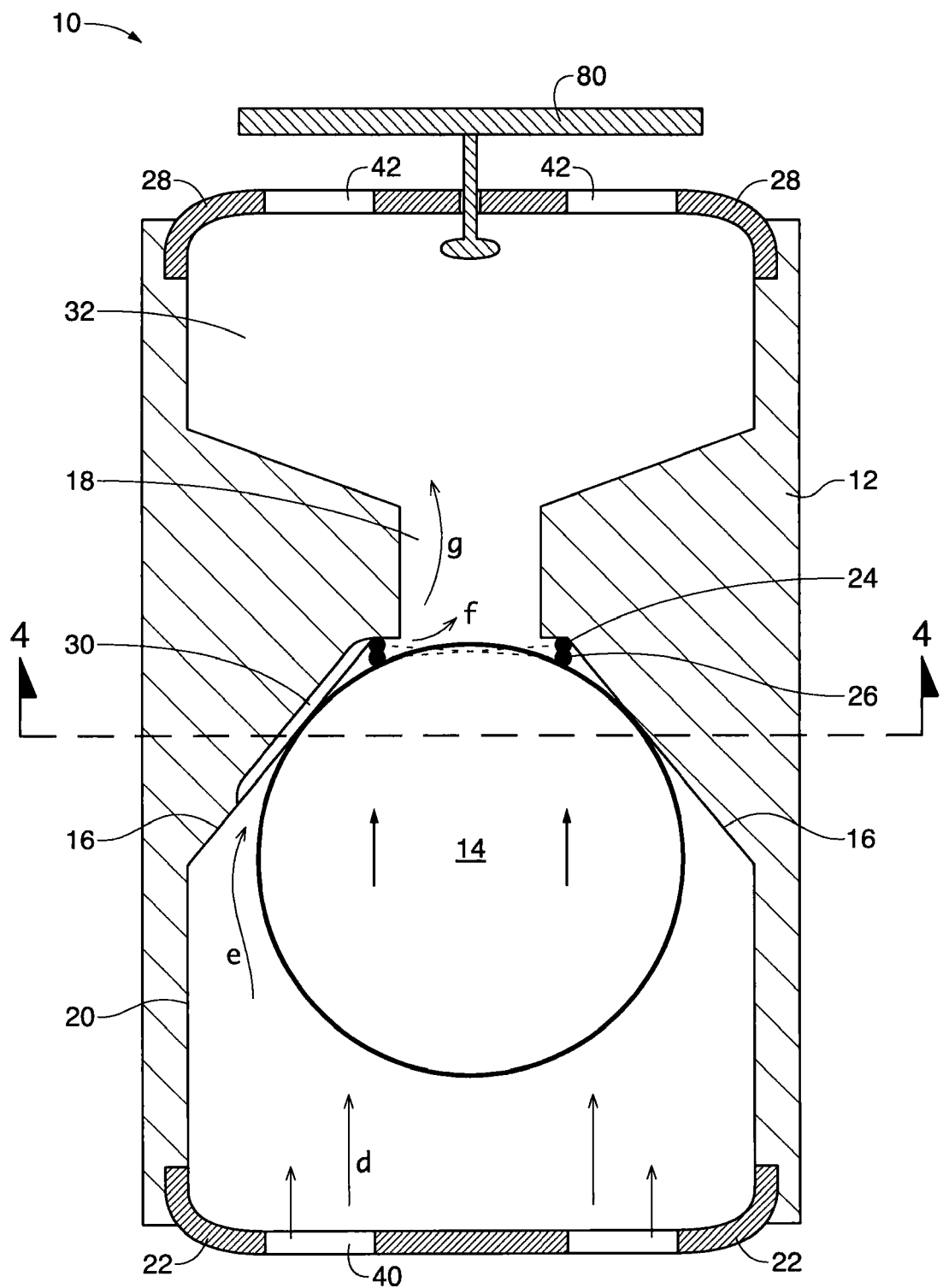
FIG. 2 is an axial cross-section of a biased normally opened check valve assembly, constructed in accordance with the present disclosure, when the check valve assembly is in a closed position.

FIG. 2 represents the biased normally opened check valve assembly 10, as described in FIG. 1, when the check valve assembly 10 is in a closed position. Once air is purged at engine start-up, hydraulic fluid enters the check valve assembly 10 through the valve inlet 40 (flow arrow d). Because hydraulic fluid is significantly more viscous than air, the viscous drag force produced by the flow of hydraulic fluid around the check ball 14 is sufficient to overcome the combined opposing forces of the spring 26 and the weight of the check ball 14. This drag force is proportional to the fluid velocity, the fluid viscosity, and the frontal area of the check ball 14. The forces acting to hold the check valve assembly 10 open include the inertia of the check ball 14, gravity acting on the check ball 14, and the load of the spring 26. The hydraulic fluid therefore causes the check ball 14 to move upward until it engages the valve seat 16. The check valve assembly 10 thus reaches a closed position. When the check valve assembly 10 reaches the closed position, the differential pressure across the check ball 14 maintains the check valve assembly 10 in the closed position.

The check ball 14 may comprise any material that is suitable for check valve assembly 10. Examples include steel, such as low carbon steel or bearing grade chromium steel, or ceramics.

When the check valve assembly 10 is in the closed position, the metering groove 30 maintains a limited and controlled flow of hydraulic fluid though the check valve assembly 10. The metering groove is disposed such that each end overlaps the surface where the check ball 14 contacts the valve seat 16. The hydraulic fluid enters the metering groove 30 below the surface where the check ball 14 contacts the valve seat 16 (flow arrow e). The hydraulic fluid flows through the metering groove 30 and exits the metering groove 30 above the surface where the check ball 14 engages the valve seat 16 (flow arrow f). The hydraulic fluid then flows through the valve opening 18 (flow arrow g) and accumulates in the chamber 32 located between the valve opening 18 and the upper retainer 28. The upper retainer 28 defines the valve outlet 42, which is closed by an anti-siphoning umbrella valve 80. Once the chamber 32 is filled, the hydraulic fluid causes the umbrella valve 80 to open and the hydraulic fluid exits the valve outlet 42, where it is free to drain back and circulate throughout the engine.

The check valve assembly 10 may comprise multiple metering grooves. The metering grooves may be of any shape, i.e., trapezoidal, rectangular, ovoid, semi-circular (U-shaped), etc. The area and shape of the metering grooves define the volume flow rate of hydraulic fluid through it at a given hydraulic fluid pressure, temperature, and viscosity. In addition, the metering grooves may be aligned in any direction. For example, the grooves may be parallel to the longitudinal axis of the check valve assembly 10 or slanted or curved.

This metering groove 30 provides several advantages over the current MultiAir® system that uses two tiny orifices to vent air and allow for the circulation of hydraulic fluid throughout the system. One advantage of the metering groove 30 is that it can be produced during the same manufacturing process, e.g., a coining, that produces the valve seat 16.

Another advantage is that the metering groove 30 is self-cleaning due to its placement in the check valve assembly 10. As the check valve assembly 10 closes, the velocity of hydraulic fluid in the vicinity of the metering groove 30 increases due to the reduction in area available for fluid flow, causing any debris to be dislodged from the metering groove 30. Thus, if there is a restriction in the groove 30, it will be temporary since engine start-up will wash the debris away.

Moreover, the metering groove 30 eliminates the need for the tiny orifices utilized in the current MultiAir® system. The replacement of the tiny orifices of the current MultiAir® system with the disclosed metering groove 30 results in reduced leaking and better retention of hydraulic fluid in the hydraulic fluid pressure chambers during extended periods of non-use of the engine, e.g., storage.

Figure 3:
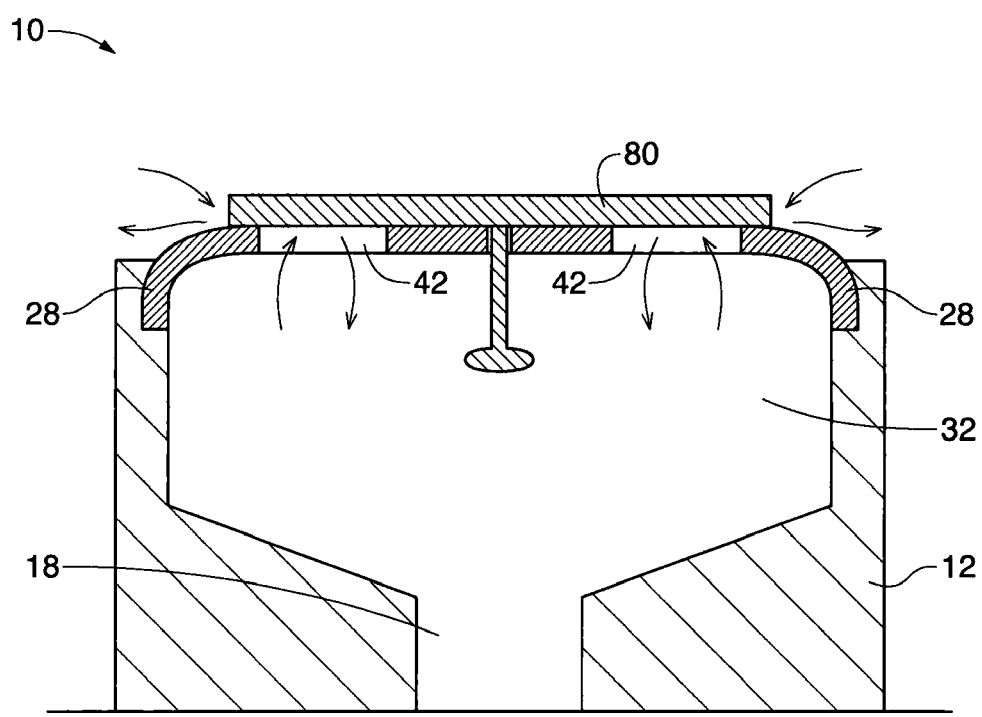
FIG. 3 is an axial cross-section of the top half of a biased normally opened check valve assembly illustrating the anti-siphoning umbrella valve, constructed in accordance with the present disclosure, during non-use of the MultiAir® engine.

FIG. 3 illustrates an anti-siphoning umbrella valve 80 of the biased normally opened check valve assembly 10, as described in FIG. 1, during non-use of the MultiAir® engine. When the engine is not in use, the hydraulic fluid pump is turned off and fluid flow c diminishes to zero, allowing gravity to pull the anti-siphoning umbrella valve down until the bottom of the anti-siphoning umbrella valve 80 contacts the smooth, top surface of the upper retainer 28, blocking the valve outlet 42 of the check valve assembly 10. The valve outlet 42 is defined by the openings in the upper retainer 28. In the chamber 32, on the underside of the anti-siphoning umbrella valve 80, there is negative pressure due to the weight of the height of hydraulic fluid below the valve outlet 42. This difference in pressure results in an anti-siphoning effect.

The anti-siphoning effect of the umbrella valve 80 prevents air and hydraulic fluid from entering the check valve assembly 10 at the valve outlet 42. Likewise, the umbrella valve 80 also prevents fluid from exiting the check valve assembly 10 at the valve outlet 42 when the engine is off, maintaining hydraulic fluid in the hydraulic fluid pressure chambers and preventing leakage during MultiAir® engine non-use.

The umbrella valve 80 may be a light weight, flexible material, such as an elastomeric polymer, which requires little force to open and which is closed by gravity and maintained closed by the differential pressure across the umbrella valve 80.

Figure 4:
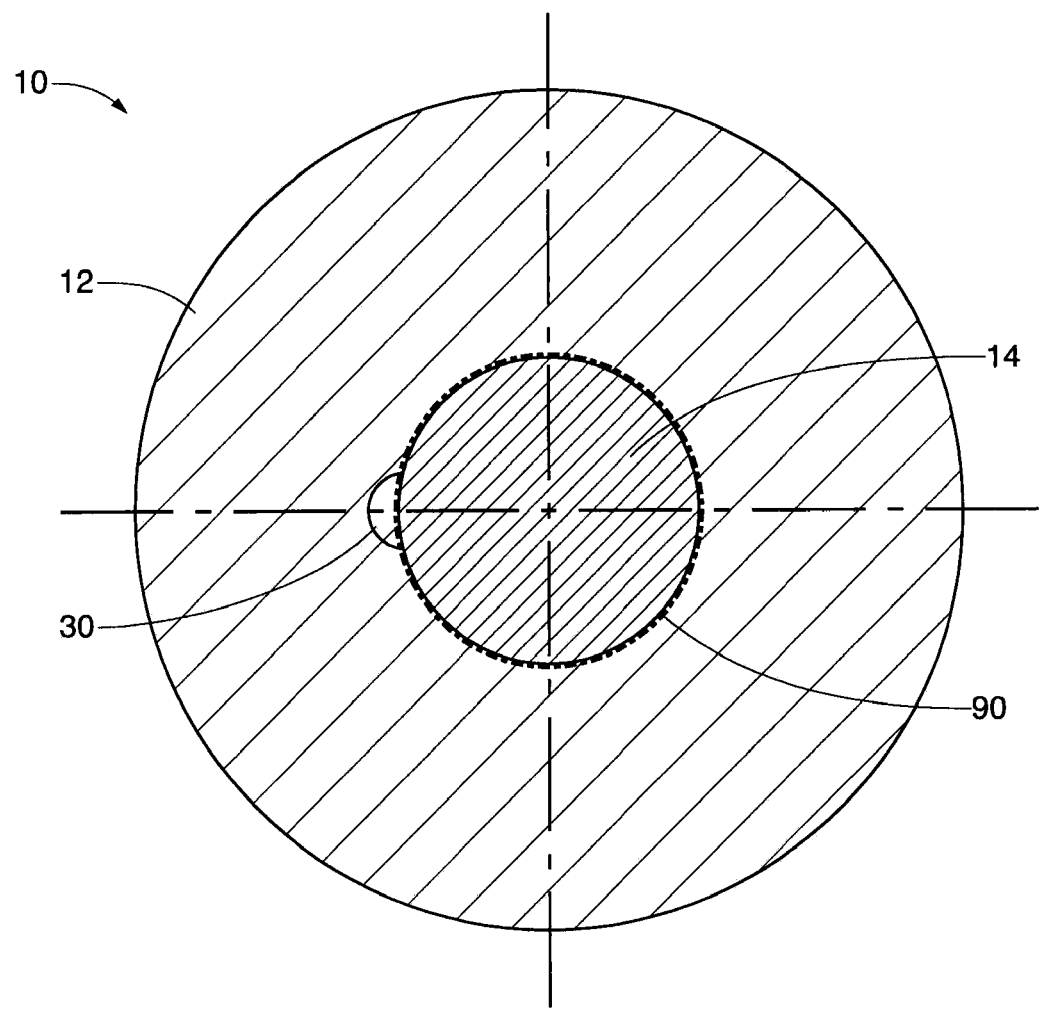
FIG. 4 is a transverse section view taken along line 4-4 of FIG. 2 of the biased normally opened check valve assembly, constructed in accordance with the present disclosure, when the check valve assembly is in a closed position.

FIG. 4 represents a transverse section view taken along line 4-4 of FIG. 2 of the biased normally opened check valve assembly, as described in FIG. 2, when the check valve assembly is in a closed position. The section view is taken through the check ball area of contact 90, that is, where the check ball 14 and the valve seat 16 (hidden by the check ball 14) contact each other. As described above, when hydraulic fluid begins to flow through the check valve assembly 10, the hydraulic fluid causes a check ball 14 to engage the valve seat 16 (hidden by the check ball 14), moving the check valve assembly 10 into a closed position. The area of contact 90 may be any size or shape depending on the check ball or member selected. The metering groove 30 is positioned such that it extends beyond the check ball area of contact 90 so that hydraulic fluid can continue to flow in a controlled manner through the check valve assembly 10 when the check valve assembly 10 is in the closed position.

Figure 5:
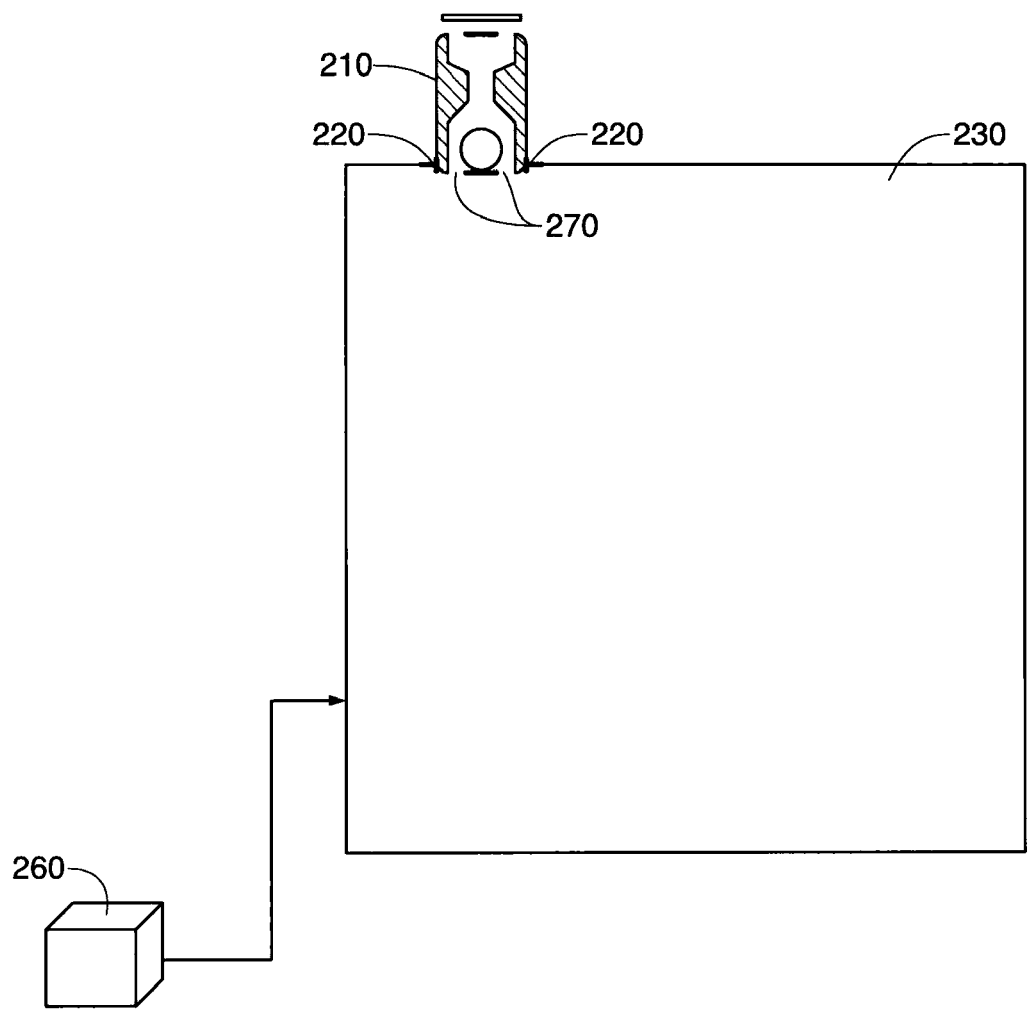
FIG. 5 illustrates the location of a biased normally opened check valve assembly within a hydraulic fluid pressure chamber of a MultiAir® engine.

FIG. 5 represents the location of a check valve assembly 210, as described in FIGS. 1-4, within a hydraulic fluid pressure chamber 230 of a MultiAir® engine. The check valve assembly 210 may be installed in an exit passageway 220 of the hydraulic fluid pressure chamber 230 that is supplied with pressurized hydraulic fluid by an external pump 260. The check valve assembly 210 is oriented in the chamber exit passageway 220 such that the check valve inlet 270 adjoins the interior of the chamber 230. The exit passageway 220 may also be located at the highest point in the chamber 230. In addition, the hydraulic fluid chamber 230 may contain multiple exit passageways 220 in which the check valve assembly 210 may be installed.

Figure 6:
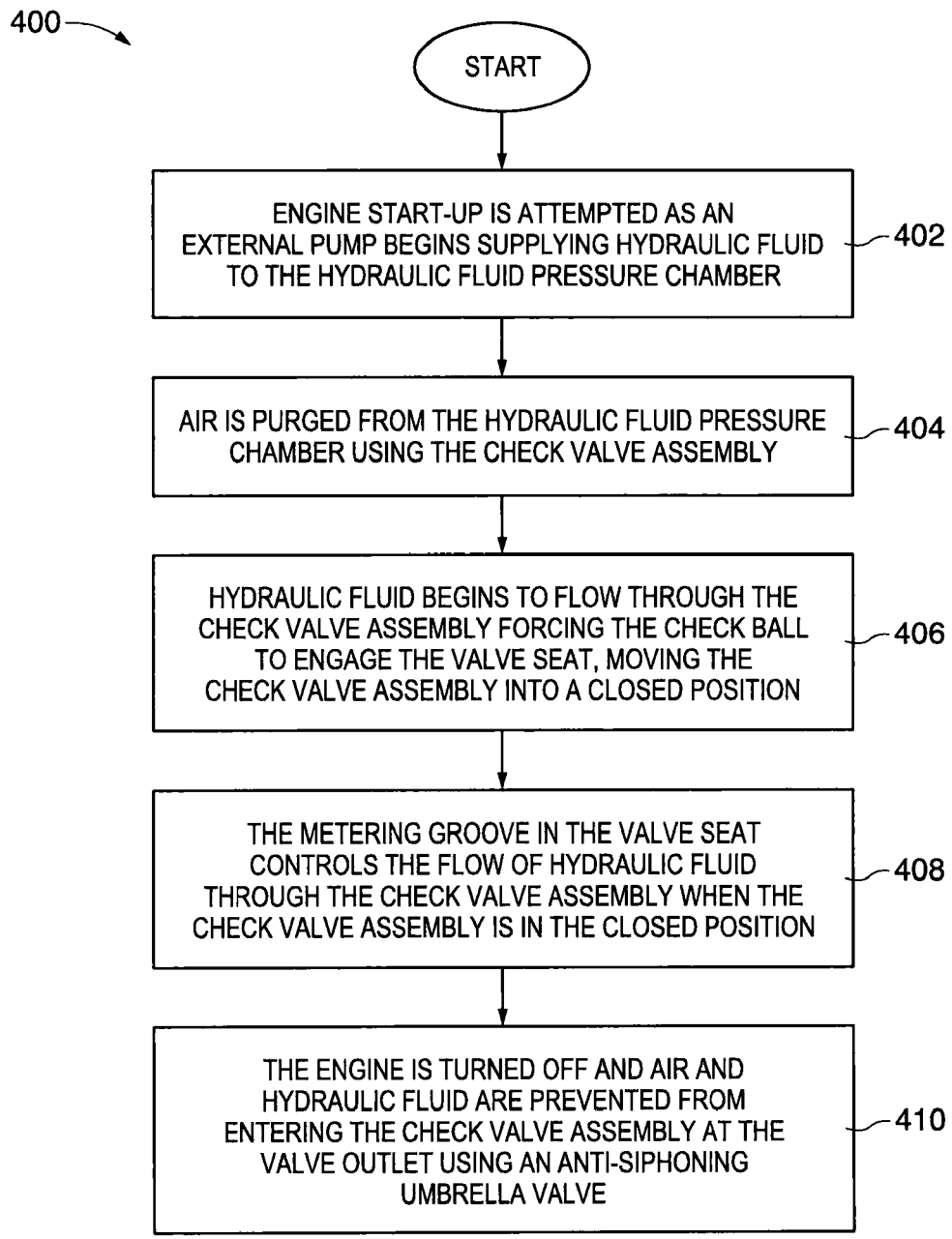
FIG. 6 illustrates a flowchart of a method of facilitating Multiair® engine start-up after extended periods of non-use (e.g., storage) of the engine.

FIG. 6 illustrates a method 400 of facilitating MultiAir® engine start-up after extended periods of non-use of the engine, e.g., storage. As mentioned above, when the engine is off, it is possible for hydraulic fluid to leak from a hydraulic fluid pressure chamber and air to replace the space previously occupied by the hydraulic fluid in the hydraulic fluid pressure chamber.

At step 402, engine start-up is attempted as an external pump begins supplying hydraulic fluid to the hydraulic fluid pressure chamber.

At step 404, air is purged from the hydraulic fluid pressure chamber using check valve assembly 10. The check valve assembly 10 is biased in an open position. Once the trapped air is purged and the hydraulic fluid returns to the hydraulic fluid pressure chamber, engine start-up is complete.

At step 406, hydraulic fluid begins to flow through the check valve assembly 10 forcing the check ball 14 to engage the valve seat 16, moving the check valve assembly 10 into a closed position.

At step 408, the metering groove 30 in the valve seat 16 controls the flow of hydraulic fluid through the check valve assembly 10 when the check valve assembly 10 is in the closed position. The hydraulic fluid enters the metering groove 30 below where the check ball 14 engages the valve seat 16 and exits the metering groove 30 above where the check ball 14 engages the valve seat 16.

At step 410, the engine is turned off and air and hydraulic fluid are prevented from entering the check valve assembly 10 at the valve outlet 42 using an anti-siphoning umbrella valve 80. The anti-siphoning umbrella valve 80 may be installed at the valve outlet of the check valve assembly 10 and/or downstream of the check valve assembly 10 (not shown). Hydraulic fluid is also prevented from exiting the check valve assembly 10 at the valve outlet 42 when the engine is off. If the anti-siphoning umbrella valve 80 is installed at the valve outlet 42, the anti-siphoning umbrella valve 80 is maintained over the valve outlet 42, blocking any flow through the valve outlet 42, by gravity and the differential pressure across the anti-siphoning umbrella valve 80. If the anti-siphoning valve is installed downstream of the check valve assembly 10 (not shown), the differential pressure maintained by the anti-siphoning umbrella valve 80 prevents flow through the valve outlet 42.

What is claimed is:

1. A check valve assembly for facilitating engine start-up, the check valve assembly associated with a hydraulic fluid pressure chamber of the engine that is configured to receive a flow of hydraulic fluid, the check valve assembly comprising:
    a body defining a lower bore, an upper bore and a valve opening formed therebetween, the lower bore defining a valve seat and the valve opening defining a necked down channel fluidly coupling the upper and lower bores;
    a metering groove formed in the valve seat, the metering groove configured to allow a controlled flow of the hydraulic fluid through the check valve assembly to a hydraulically actuated valvetrain of the engine when the check valve assembly is in a closed position;
    a lower retainer coupled to a lower end of the lower bore to define a lower chamber housing a check ball, the lower retainer defining a central support area for supporting the check ball and a plurality of valve inlets adjacent the central support area;
    an upper retainer coupled to an upper end of the upper bore to define an upper chamber, the upper retainer including an anti-siphoning umbrella valve slidably coupled thereto and defining a plurality of valve outlets, the anti-siphoning umbrella valve configured to open and close the valve outlets;
    wherein the check ball is operable to engage the valve seat in a closed position and is biased in a normally open position to engagement with the central support area, allowing air to flow through the check valve assembly and out the valve outlets to purge air from the hydraulic fluid pressure chamber for the engine start-up, until hydraulic fluid enters the valve inlets and causes the check valve assembly to move into the closed position such that the controlled flow of the hydraulic fluid is supplied through the metering groove to the hydraulically actuated valvetrain.

2. The check valve assembly of claim 1, wherein the anti-siphoning umbrella valve is configured for preventing air and hydraulic fluid from entering the check valve assembly through the valve outlet, the anti-siphoning umbrella valve including an umbrella portion and a stem portion, the umbrella portion disposed outside of the upper chamber and at least a portion of the stem portion extending through the upper retainer and into the upper chamber.

3. The check valve assembly of claim 2, wherein the anti-siphoning umbrella valve also prevents hydraulic fluid from exiting the check valve assembly at the valve outlet when the engine is off.

4. The check valve assembly of claim 1, wherein the check ball is connected to one end of a biasing spring and the other end of the biasing spring is connected to a spring seat disposed against the valve seat.

5. The check valve assembly of claim 4, wherein the spring seat is concentric with and disposed adjacent the valve opening.

6. The check valve assembly of claim 1, wherein the check valve assembly is in the open position when the check ball is positioned away from the valve seat and the check valve assembly is in the closed position when the check ball engages the valve seat.

7. The check valve assembly of claim 1, wherein hydraulic fluid enters and exits the metering groove at opposite sides of the level where the check ball engages the valve seat.

8. A method for facilitating engine start-up for an engine having a hydraulically actuated valvetrain, the method comprising:
    purging air from a hydraulic fluid pressure chamber of the hydraulic valvetrain using a check valve assembly;
    controlling a flow of hydraulic fluid from the hydraulic fluid pressure chamber, through the check valve assembly, to a hydraulically actuated valve of the engine using a metering groove of the check valve assembly; and
    preventing air and hydraulic fluid from entering the check valve assembly at a valve outlet when the engine is off using an anti-siphoning umbrella valve;
    wherein the check valve assembly is biased in an open position during the step of purging air from a hydraulic fluid pressure chamber using a check valve assembly, and wherein the check valve assembly is in a closed position during the step of controlling the flow of hydraulic fluid through the check valve assembly using a metering groove.

9. The method of claim 8, wherein the anti-siphoning umbrella valve is at the valve outlet of the check valve assembly.

10. The method of claim 8, wherein the anti-siphoning umbrella valve is downstream from the check valve assembly.

* * * * *